April 17, 1951 W. A. BIERMANN ET AL 2,549,413
MULTIBURNER FUEL CONTROL DEVICE
Filed Oct. 9, 1944 3 Sheets-Sheet 1
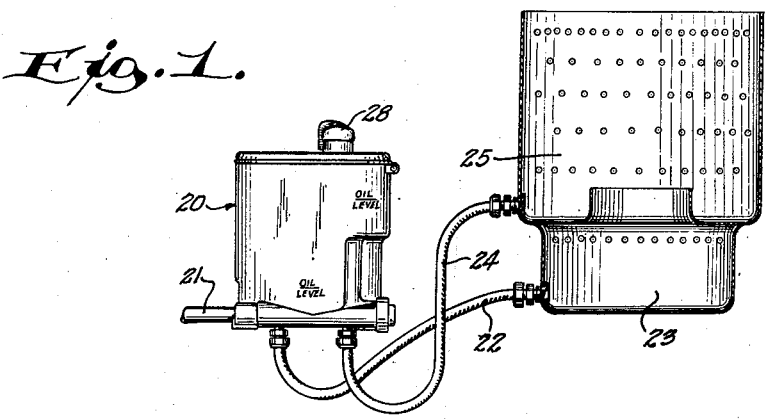
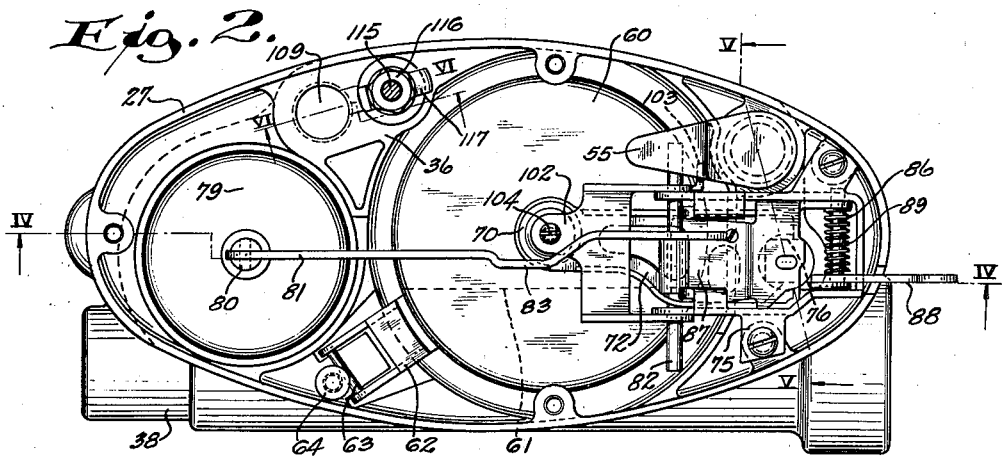
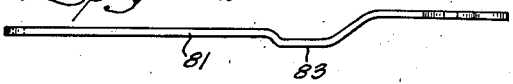
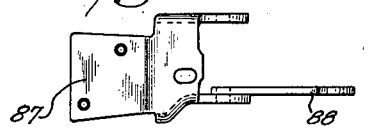
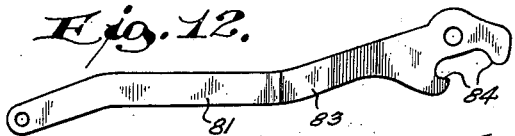
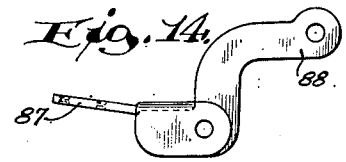
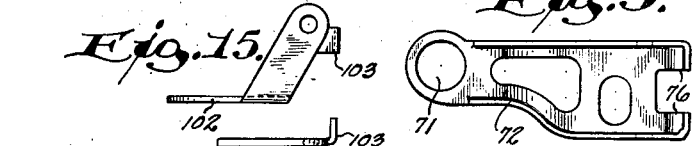
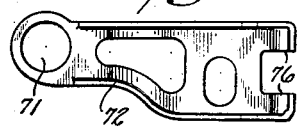
INVENTORS.
WILLIAM A. BIERMANN
LOURDES V. McCARTY.
BY John W. Michael
ATTORNEY.

April 17, 1951 W. A. BIERMANN ET AL 2,549,413
MULTIBURNER FUEL CONTROL DEVICE

Filed Oct. 9, 1944 3 Sheets-Sheet 2

INVENTORS.
WILLIAM A. BIERMANN
LOURDES V. McCARTY.
BY
ATTORNEY.

April 17, 1951     W. A. BIERMANN ET AL     2,549,413
MULTIBURNER FUEL CONTROL DEVICE Filed Oct. 9, 1944     3 Sheets-Sheet 3

INVENTORS.
WILLIAM A. BIERMANN
LOURDES V. McCARTY.
BY John W. Michael
ATTORNEY

Patented Apr. 17, 1951

2,549,413

UNITED STATES PATENT OFFICE 2,549,413

MULTIBURNER FUEL CONTROL DEVICE

William A. Biermann and Lourdes V. McCarty, Milwaukee, Wis., assignors to A P Controls Corporation, a corporation of Wisconsin Application October 9, 1944, Serial No. 557,772

12 Claims. (Cl. 137—68)

This invention relates to improvements in devices for controlling the flow of liquid fuel to a burner and particularly to a unitary means for controlling fuel flow to a plurality of burners.

It is one object of the present invention to provide a liquid fuel control device for simultaneously controlling the flow to two or more fuel burners.

Another object of the invention is to provide a device for controlling the flow of liquid fuel to a plurality of burners at different levels.

Another object of the invention is to provide means for simultaneously controlling the flow of liquid fuel to a plurality of burner sections formed in the same fire-pot at different levels.

Another object of the invention is to provide a liquid fuel flow control device in which a single means controls the flow of fuel into the device and separate means are employed for regulating simultaneous flow of fuel from the device to a plurality of burners at different levels.

Objects and advantages other than those above set forth will be apparent from the following description when read in connection with the accompanying drawings in which:

Fig. 1 is a perspective view showing the control device of the present invention in operative relation to a fuel burner having two burner sections;

Fig. 2 is a top plan view of the control device with the top portion thereof removed;

Figs. 9 and 10 are a top and a side view, respectively, of one lever of the device;

Figs 11 and 12 are a top and a side view, respectively, of another lever of the device;

Figs. 13 and 14 are top and side views, respectively, of a third lever of the device; and Figs. 15 and 16 are a top and a side view, respectively, of a fourth lever of the device.

Figure 3:
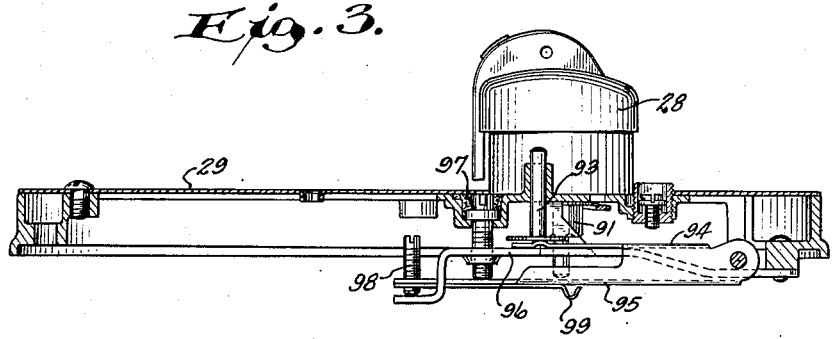
Fig. 3 is a vertical cross section taken through the top portion of the fuel flow control device.

Referring to the drawings by reference numerals, the numeral 20 generally designates a control device for liquid fuel supplied to the device by way of a conduit 21 (from a suitable source not shown) and from which the liquid fuel is supplied either by a conduit 22 to the low fire or pilot section 23 of a burner or by way of a conduit 24 to the high fire or main section 25 of a fuel burner. The control mechanism of the present invention is housed within a casing body portion generally designated 27 except for a hand knob 28 extending above a top portion 29 of the casing body. The casing is formed with a plurality of chambers 31, 32, and 33, separated respectively by dams or walls 34 and 35, the dam 34 having a weir notch 36 formed in the upper edge thereof. It will be apparent from the drawings that the bottom of chamber 31 is elevated by a considerable distance above the bottom of the casing which also forms the bottom of the chambers 32 and 33.

Figure 4:
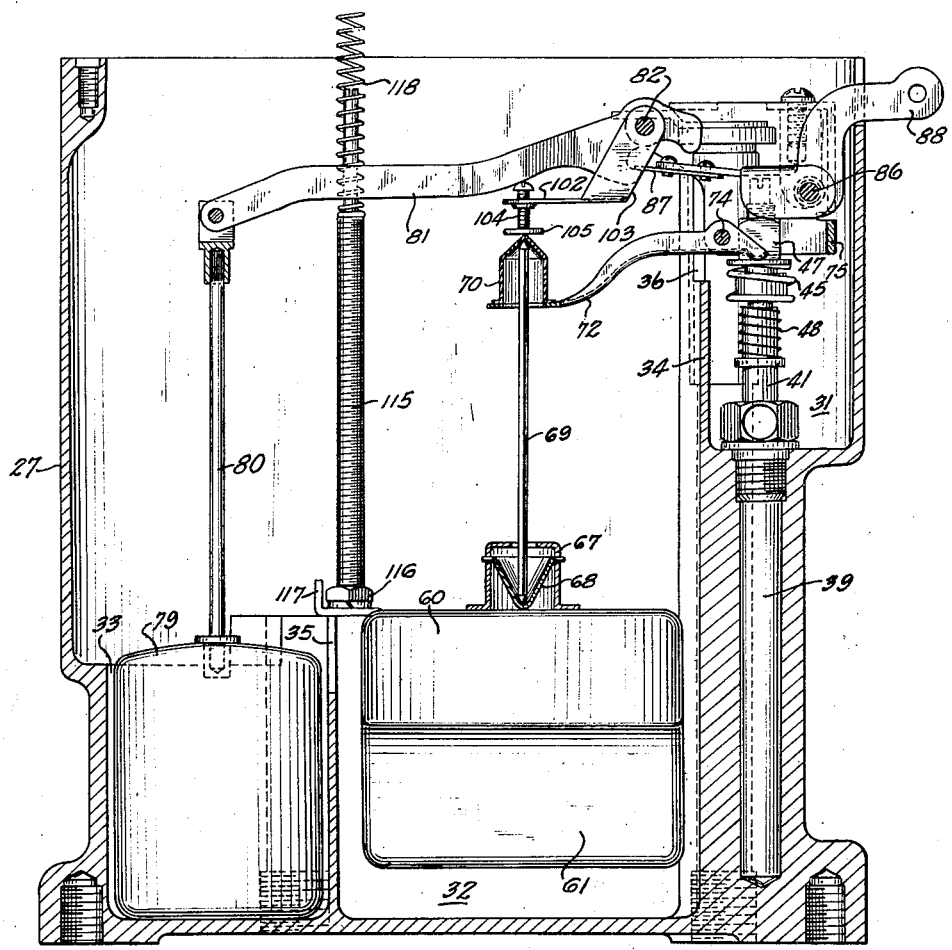
Fig. 4 is a vertical cross section taken on the plane of the line IV—IV of Fig. 2.
Figure 5:
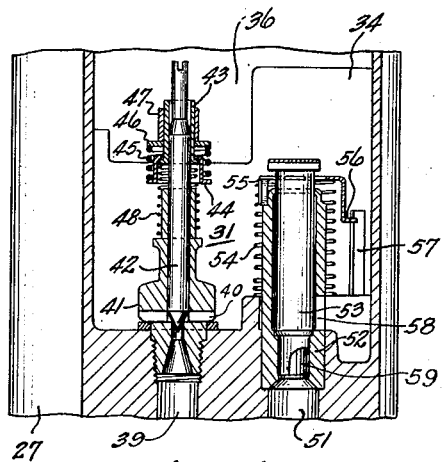
Fig. 5 is a fragmentary sectional view taken on the plane of the line V—V of Fig. 2 to show the structure and relationship of the inflow control and one of the outflow control means of the device.
Figure 6:
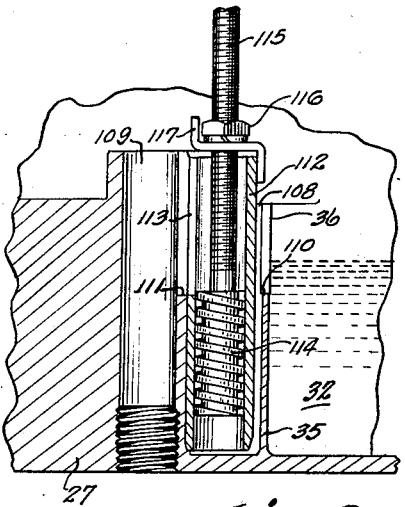
Fig. 6 is a fragmentary sectional view taken on the plane of the line VI—VI of Fig. 2 and illustrating another outflow control means of the device.

The inlet conduit 21 is connected with a passageway indicated at 38 for receiving a strainer of the type shown in Letters Patent 2,369,740 issued to Roy W. Johnson and Lourdes V. McCarty, on February 20, 1945, and connecting with a second inlet passage 39 (see Figs. 4 and 5). The end of the passageway 39, adjacent the chamber 31, is interiorly threaded to receive a valve casing 41 formed with an axial passage thereto and an internal shoulder providing a seat for a valve 42 controlling the flow of fuel through the inlet passages 38, 39 and through transverse ports 40 in the valve casing 41 and into the chamber 31. The inlet valve 42 is shown as being of the needle type slidably fitted in the upper portion of the valve casing 41 and as having an exteriorly threaded and flanged sleeve 43 secured to the upper portion thereof. A flanged member 44 seats on the flange of the sleeve 43 and provides a seat for a spring 45 compressed against a washer 46 under the action of a nut 47 threaded on the sleeve, the spring holding the nut in any preadjusted position. The upper portion of the valve casing 41 is surrounded by a spring 48 acting between a shoulder on the valve casing and the flange on the sleeve 43 to bias the valve 42 toward open position.

Fuel passing through the inlet valve 41, 42 into chamber 31 is supplied to the burners 23 and 25 under the control of separate means, supply of fuel to the burner section 25 being controlled by a metering valve in a discharge passage 51 leading from the chamber 31 and connected with the conduit 24. The metering valve (see Fig. 5) comprises a tubular valve casing 52 with a port indicated at 58 communicating with the chamber 31 and which is fitted into the end of the passage 51 to provide a guide and seat for the reduced lower end portion of a substantially tubular metering valve 53. The metering valve 53 is slotted as indicated at 59, at its lower end to permit precise control of the amount of fuel passing therethrough dependent on the degree to which the slot in the valve is exposed to the port in the valve casing. The metering valve is biased toward open position by a spring 54 compressed between an abutment on the casing body 27 and a yoke-like collar 55 fitted on the upper end of the valve 53. The collar 55 has an outturned finger 56 engageable between ribs 57 or in a groove on the wall of chamber 31, to prevent rotational movement of the valve.

Figure 7:
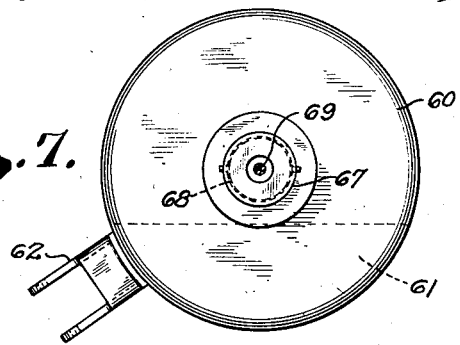
Fig. 7 is a top plan view of the main float of the device and of the bracket for pivotally mounting the float in the casing portion of the device.
Figure 8:
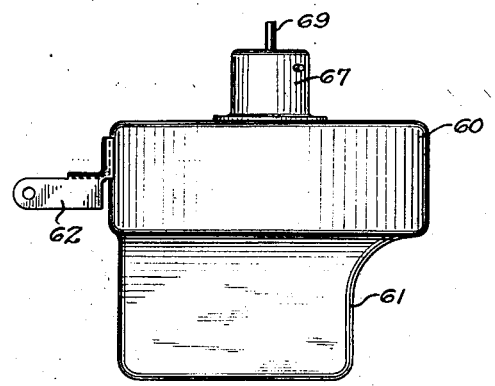
Fig. 8 is an elevational view of the main float and its bracket.

The degree to which the inlet valve 42 is opened is determined by the position of a float acting on such valve through a leverage. Referring now to Figs. 7 and 8, the float may be considered as including an upper portion 60 which is generally cylindrical and a lower portion 61 which is cut back on one side to compensate for the extension of the wall of the inlet passage 38 into the chamber 32 along one side thereof and into which the float is fitted. A bracket 62 extends laterally from the side of the top portion 60 of the float for pivotal mounting on a pin 63 secured on the side of the casing body 27 and in or adjacent to the dam 35 therein. The pin 63 is removably held in a seat therefor by a screw 64 threaded into the casing body.

A socket is formed on the top of the float 60, 61 by a cup-like member 67 in which is mounted a conical member 68 to receive one end of a rod 69 extending through an aperture in the cup 67. The other end of the rod 69 extends into a second cup-shaped member 70 having a substantially conical bottom, the ends of the rod 69 being pointed and coacting with the members 68 and 70 as universal joints. The cup 70 is mounted in an aperture 71 in one end of a lever 72 (see Figs. 9 and 10) which is pivotally mounted at 73 on a pin 74, the pin 74 being mounted in a bracket 75 fixed in the casing body 27. The other end 76 of the lever 72 is bifurcated to straddle the inlet valve stem and the ends are rounded to bear on the washer 46 on two sides of the nut 47 on the inlet valve 42. It will be seen that the rod 69 and the lever 72 form a leverage with universal joints by which rocking of the float 60, 61 about its pivot 63, in response to variations in fuel level in the chamber 32, is transmitted to the inlet valve 42 to close the valve as the fuel rises to a predetermined level.

Even though inlet valve casing 41 and the inlet valve 42 are properly fitted to secure sliding of the valve 42 in the casing 41, and even though the fuel passes through a strainer, it is possible for the inlet valve to stick or for foreign material to cause the inlet valve to remain open in spite of the above-described action of the float and its leverage to close the valve. Snap action means are therefore provided which can drive the valve into the closed position thereof under predetermined conditions. Such means include an auxiliary float 79 acting in the chamber 33 and joined by a rod 80 with one end of a latch lever 81 (see Figs. 11 and 12) pivoted intermediate its ends on a pin 82 extending across the mounting bracket 75. It will be observed that the lever 81 is formed with an offset portion 83 to provide clearance for the movement of other portions of the structure to be described. The end of the lever 81 adjacent to the pivot 82 is formed with a jaw-like shape 84 to receive one end of a striker lever (see Figs. 13 and 14) pivoted at 86 on the mounting bracket 75 and having one of its ends 87 engageable with the jaws 84 of the latch lever 81, while the other end 88 of the striker lever extends beyond the casing for use as a relatching or resetting handle. The striker lever 87, 88 is biased in a downward direction by a spring 89 acting between the mounting bracket 75 and the lever. Under normal circumstances, only a small amount of fuel is present in chamber 33 and the auxiliary float 79 holds the jaw end 84 of the latch lever 81 up to maintain engagement thereof with the striker lever 87, 88 against the action of the spring 89. However, when the inlet valve 42 sticks in the open position, excess fuel flows into the chamber 33 from the chamber 32 to raise the float 79 and thereby release the striker lever 87—88, and the spring 89 then snaps the striker lever down against the extending end of the inlet valve 42 to force the valve into closed position.

The degree of opening of the meter valve 53 is controlled by shifting the knob 28 or by actuation of a mechanism now to be described. The knob 28 bears a stud 91 and is provided with a cam structure (see U. S. Letters Patent 2,293,903, issued to Roy W. Johnson on August 25, 1942) by which action of the metering valve opening spring 54 is controllable manually. A leverage is also provided for controlling the metering valve automatically and includes a pin 93 extending through the casing top 29 to rest on one arm 94 of a lever pivotally mounted on the casing top and having a second arm 95 offset from the first arm. The lever arm 94 overlies an arm 96 of resilient material fixed at one end on the casing top and engaged near its free end by a screw 97 mounted to swivel in the casing top for the purpose of flexing the arm 96 in either direction. The lever arm 95 bears a screw 98 at its free end engageable with the free end of the resilient arm to determine the low fire position of the metering valve. A leaf spring 99 extends from the lever arm 95 over the top of the metering valve 53 to engage the valve in certain of its adjusted conditions as is explained in the patent immediately above identified. When the metering valve is manually controlled, the stud 91 bears on the spring 99 to determine the position thereof until the lever arm 95 brings the screw 98 into engagement with the arm 96 in the low fire position of the metering valve. Further movement of the knob 28 in the valve closing direction then flexes the spring 99 to close the metering valve.

A lever (see Figs. 15 and 16) with two arms 102 and 103 is pivotally mounted on the pin 82, the arm 102 being of such length as to extend over the socket cup 70 and being provided with a screw 104 having a head 105 engageable with the apex of the conical portion of the cup 70 regardless of the movement thereof. The lever arm 103 extends laterally into position to be engaged by the yoke 55 secured on the upper end of the metering valve 53 to raise the screw head 105 from contact with the socket cup 70 when the metering valve is closed and to allow the screw head on the longer lever arm 102 to swing into contact with the socket cup when the metering valve is opened.

A device for regulating the continuous flow of fuel to the pilot section 23 of the burner is mounted in the dam or wall 35 separating the chambers 32 and 33. A well 108 is formed in such wall and a passage 109 is formed through the casing body 27 adjacent the well, the well being connected with the chamber 32 by a weir notch 110 and with the passage 109 by a weir notch 111. A sleeve 112 is so mounted in the well 108 as to leave a space extending from the weir 110 between the wall 36 and the sleeve and to leave a space beneath the end of the sleeve. The sleeve is provided with a notch 113 registering with the notch 111 to complete a passage for the flow of oil from the chamber 32 through the notch 110 along the outside and into the end of the sleeve 112, up through the sleeve and through the notches 111 and 113 into the passage 109 from which the fuel flows by way of conduit 22 to the pilot burner section 23. The quantity of fuel flowing through the above path is controlled by a plug having a grooved portion 114 fitting into the sleeve and a stem portion 115 extending up through the casing body to adjacent the casing top. The groove on the plug portion 114 is preferably made as a relatively coarse thread so that, in coaction with the well, the thread defines a passage of relatively small cross sectional area or a so-called capillary passage through which the fuel flows at a rate dependent on the effective length of the passage below the bottom of the notch 113. The position of the plug portion 114 is varied by turning the stem 115 which threadedly engages a nut 116 held stationary by a lock 117. Undesired change in the length of the capillary passage is prevented by placing the member 114, 115 under the compression of a spring 118 acting between a shoulder on the stem 115 and the casing top 29.

The operation of the device will now be described through an entire control cycle. Assuming that no fuel is present in the device and that the metering valve 53 is closed, both the main float 61 and the auxiliary float 79 will rest on the bottom of their respective chambers 32 and 33. The lever 81 then latches the striker 87—88 in raised position and there is no pressure on the inlet valve 42 which resists the opening of the valve by the spring 48. The fuel then fills the chamber 31 and overflows from the chamber through the weir 36 into the chamber 32. The float 60—61 rises by pivoting about the pin 63 as the fuel level rises and the fuel overflows through the notch 110 into the pilot flow control means. The inlet valve 42 is closed by the rising float until the inlet valve admits the exact quantity of fuel which is passed by the pilot flow control means to the burner section 23.

When the metering valve 53 is opened to supply fuel to the main burner section 25, the level of the fuel in the chamber 31 temporarily drops below the lip of the weir 36. However, opening of the metering valve raises the yoke 55 thereon out of engagement with the lever arm 103, and the lever 102—103 then rotates counter-clockwise to press the screw 105 on the cup 70 which submerges the float 61 to a greater depth than it was submerged theretofore. Such increased submergence immediately offsets the lack of fuel flow into the chamber 32 due to the drainage of fuel from the chamber 31 by way of the metering valve. The inlet valve 43 is thus allowed to open sufficiently to again raise the liquid level in the chamber 31 sufficiently to provide for overflow into chamber 32 which will keep the liquid level therein at the point from which fuel again may be supplied to the pilot section of the burner, thus assuring an adequate flow of fuel thereto at all times. When equilibrium of inflow and outflow is again reached, the level in the chamber 32 is slightly higher than before opening the metering valve 53 and such higher level is maintained until the metering valve is again closed. Closure of the metering valve brings the yoke 55 down on the lever arm 103 and rotates the lever 102—103 in a clockwise direction away from the cup 70 and therefore allows the float 61 to rise to a position determined by its buoyance. The inlet valve 42 then recloses to a point at which the flow therethrough again exactly equals the flow to the pilot burner 23 and the normal fuel level in chamber 32 is restored.

It will be seen from the above description that the present control provides a unitary device by which a plurality of liquid fuel burners may be simultaneously supplied with the required quantity of fuel in spite of the fact that the burners may be at different levels. Flow into the device is controlled by a single valve in response to movement of a float upon variation in level of the liquid in one chamber of the device. Flow of the fuel out of the device to the several burners is individually controlled by separate flow-regulating means which may be either manually or automatically adjustable valves opened intermittently or may be continuous flow devices such as shown, or may be both such devices as shown. Temporary diminution in the fuel supplied to one of the outflow control means may be offset by having such means impose a load on the float to cause greater submergence thereof and hence displacement of some of the fuel in the chamber and to raise the liquid level until equilibrium in inflow and outflow is reestablished.

We claim:

1. A device controlling the flow of liquids to a plurality of discharge points and comprising a casing having a plurality of chambers at different levels therein, an inlet valve in the higher chamber to control the flow of liquid into the casing, means for directing overflow from the higher chamber into the lower chamber, a float in the lower chamber for controlling opening of the inlet valve responsive to changes in liquid level in the lower chamber, a leverage connecting the valve with the float, a metering valve in the higher chamber for controlling the flow of liquid therefrom to one point of discharge, means receiving liquid from the lower chamber and metering means controlling the flow therefrom to another point of discharge.

2. A device controlling the flow of liquids to a plurality of discharge points and comprising a casing having a plurality of chambers therein, a reciprocally movable inlet valve controlling the flow of liquid into the casing, a float pivoted in the casing and on the casing wall and rocking therein for controlling opening of the inlet valve responsive to changes in the liquid level within one chamber of the casing, a leverage connecting the valve with the float, the leverage having a universal joint to transmit rocking of the float to reciprocate the inlet valve, a manually adjustable metering valve controlling flow from the casing to one point of discharge therefrom, and manually adjustable means in the casing for controlling liquid flowing from the casing to another point of discharge therefrom.

3. A device controlling the flow of liquids to a plurality of discharge points and comprising a casing having a plurality of chambers at different levels therein, an inlet valve in the higher chamber for controlling the flow of liquid into the casing, a float in the lower chamber for controlling opening of the inlet valve responsive to changes in a liquid level within the casing, a leverage connecting the inlet valve with the float, a metering valve in the higher chamber for intermittently controlling flow of liquid from the casing to one point of discharge, and means connected with the lower chamber for continuously controlling the flow of liquid from the casing to another point of discharge, said means forming a capillary passage of variable length.

4. A device controlling the flow of liquids to a plurality of discharge points and comprising a casing having a plurality of chambers at different levels therein, an inlet valve in the higher chamber for controlling the flow of liquid into the casing, a float in the lower chamber for controlling opening of the inlet valve responsive to changes in a liquid level within the casing, a leverage connecting the valve with the float, a metering valve in the higher chamber for intermittently controlling flow of liquid from the casing to one point of discharge, and a grooved plug coacting with a passage in the casing to form a capillary passage of variable length connected with the lower chamber for continuously controlling flow of liquid to another point of discharge from the casing.

5. A device controlling the flow of liquid and comprising a casing, an inlet valve controlling flow of liquid into the casing, a float, a leverage connecting the inlet valve with the float for controlling valve opening in response to changes in the level in the casing to maintain a constant level, a metering valve controlling liquid flow from the casing to a point of discharge therefrom, and lever means released upon opening of the metering valve to act on the leverage and oppose the buoyancy of said float to raise the level maintained in the casing.

6. A device controlling the flow of liquid and comprising a casing, an inlet valve controlling flow of liquid into the casing, a float pivoted in the casing and rocking therein responsive to changes in a liquid level within the casing, a lever axially moving the inlet valve, a rod transmitting rocking movement of the float to the lever to control opening of the inlet valve responsive to float movement, a metering valve controlling flow of liquid from the casing, a lever held in predetermined position by and released upon opening the metering valve to act on the first said lever, and a spring urging movement of the second said lever in one direction upon release thereof by the metering valve.

7. A liquid fuel control device for supplying fuel to a plurality of fuel discharge points at different levels comprising a casing, an inlet valve controlling the flow of liquid fuel into the casing, a float in the casing for controlling the opening of the inlet valve responsive to liquid level variations in the casing, a metering valve adapted to control flow of fuel to one of the discharge points, means actuated upon opening of the metering valve for varying movement of the float independently of liquid level variations about the float, and means dependent on the liquid level about the float and adapted to regulate fuel flow to another discharge point.

8. A liquid fuel control device for supplying fuel to a plurality of fuel discharge points at different levels comprising a casing, an inlet valve controlling the flow of liquid fuel into the casing, a float actuated by fuel level variations in the casing, a leverage connected with the inlet valve and acting thereon upon movement of the float responsive to liquid level variations, a metering valve controlling fuel flow to one of the discharge points, lever means actuated upon opening of the metering valve and acting on the leverage for varying movement of the float independently of liquid level variations thereabout, and means dependent on the liquid level about the float adapted to regulate flow to another discharge point.

9. A liquid fuel control device for supplying fuel to discharge points at different levels comprising a casing, an inlet valve controlling the flow of liquid fuel into the casing, a float actuated by fuel level variations in the casing, a leverage connected with the inlet valve and acting thereon upon movement of the float responsive to liquid level variations, a metering valve controlling fuel flow to one of the discharge points, lever means rocked upon opening of the metering valve to press on the leverage for submerging the float to a greater depth than the depth responsive to the then liquid level about the float, such pressure compensating for lowering the liquid level following opening of the metering valve, and a capillary passage adjustable in length adapted to control fuel flow to another discharge point and being dependent on the liquid level about the float.

10. A unitary liquid fuel flow control device comprising, a casing having two chambers at different levels, an inlet valve in the higher level chamber and adapted to regulate flow into said higher chamber, means connecting said chambers so the overflow from the higher chamber goes into the lower chamber, a float in the lower chamber connected to said inlet valve to regulate movement of said valve in response to the level in said lower chamber, a capillary passage providing an outlet from said lower chamber and continuously passing fuel from said lower chamber, an outlet valve in said higher chamber for intermittently passing fuel from the higher chamber.

11. A unitary liquid fuel flow control device comprising, a casing having two chambers at different levels, an inlet valve in the higher level chamber and adapted to regulate flow into said higher chamber, means connecting said chambers so the overflow from the higher chamber goes into the lower chamber, a float in the lower chamber connected to said inlet valve to regulate movement of said valve in response to the level in said lower chamber, a capillary passage providing an outlet from said lower chamber and continuously passing fuel from said lower chamber, an outlet valve in said higher chamber for intermittently passing fuel from the higher chamber, and means responsive to opening said outlet valve to oppose the buoyancy of said float and raise the level maintained in said lower chamber to insure steady overflow from said higher chamber to said lower chamber.

12. A unitary liquid fluel flow control device comprising, a casing, a float in said casing, an inlet valve operated by said float in accordance with the liquid level in said casing to regulate flow into the casing, a capillary outlet passage continuously passing fuel from the casing, a normally closed outlet valve adapted for intermittent opening to pass additional fuel from the casing, and means responsive to opening said outlet valve to oppose the buoyancy of said float and cause the level maintained in the casing to be increased.

WILLIAM A. BIERMANN.
LOURDES V. McCARTY.

REFERENCES CITED

The following references are of record in the file of this patent:

UNITED STATES PATENTS

| Number | Name | Date |
|---|---|---|
| 118,979 | Silber et al. | Sept. 12, 1871 |
| 540,585 | Doerhoefer | June 4, 1895 |
| 2,012,004 | Hall | Aug. 20, 1935 |
| 2,079,348 | Hann | May 4, 1937 |
| 2,086,884 | Sherman | July 13, 1937 |
| 2,196,999 | Longhridge | Apr. 16, 1940 |
| 2,199,538 | Curry | May 7, 1940 |
| 2,238,108 | Gates | Apr. 15, 1941 |
| 2,243,536 | Rouan et al. | May 27, 1941 |
| 2,267,187 | Bock | Dec. 23, 1941 |
| 2,346,817 | Breese et al. | Apr. 18, 1944 |
| 2,353,341 | Klonaris | July 11, 1944 |
| 2,355,870 | Johnson | Aug. 15, 1944 |
| 2,374,076 | Burckhardt | Apr. 17, 1945 |
| 2,404,853 | Landon | July 30, 1946 |